United States Patent
Dackefjord et al.

(10) Patent No.: US 10,366,552 B2
(45) Date of Patent: Jul. 30, 2019

(54) METHOD FOR LOCKING, UNLOCKING AND POSITIONING OF A TOOL

(71) Applicant: NiDa Tech Sweden AB, Malmö (SE)

(72) Inventors: Håkan Dackefjord, Älvsjö (SE); Warwick Taws, Bromma (SE)

(73) Assignee: NiDa Tech Sweden AB, Malmo (SE)

( * ) Notice: Subject to any disclaimer, the term of this patent is extended or adjusted under 35 U.S.C. 154(b) by 0 days.

(21) Appl. No.: 15/997,990

(22) Filed: Jun. 5, 2018

(65) Prior Publication Data
US 2018/0286158 A1     Oct. 4, 2018

Related U.S. Application Data

(63) Continuation-in-part of application No. 15/876,156, filed on Jan. 21, 2018, which is a continuation of
(Continued)

(51) Int. Cl.
*E05B 43/00*     (2006.01)
*G07C 9/00*     (2006.01)
(Continued)

(52) U.S. Cl.
CPC .......... *G07C 9/00111* (2013.01); *E05B 39/00* (2013.01); *E05B 39/005* (2013.01); *E05B 43/005* (2013.01); *G07C 9/00103* (2013.01); *H04B 17/318* (2015.01); *E05B 43/00* (2013.01); *E05B 47/00* (2013.01);
(Continued)

(58) Field of Classification Search
CPC ....... G07C 9/00; E05B 47/00; E05B 47/0079; E05B 39/00; E05B 39/005; E05B 39/04; E05B 47/0001; E05B 43/005; G08B 25/008
See application file for complete search history.

(56) References Cited

U.S. PATENT DOCUMENTS

2007/0252675 A1* 11/2007 Lamar .................... B25F 5/00
                                                                            340/5.64
2007/0288995 A1* 12/2007 Terada .................. H04L 63/107
                                                                             726/2
(Continued)

FOREIGN PATENT DOCUMENTS

DE        102010029671 A1 * 12/2011 ......... G06Q 10/0833

*Primary Examiner* — Benyam Haile
(74) *Attorney, Agent, or Firm* — Gabriela B. Tomescu, Esq.; Bergenstråhle & Partners AB

(57) ABSTRACT

Methods, nodes, a power tool and computer programs for and in a power tool (100) for enabling unlocking and locking of the power tool for prevention of unauthorized use, the method comprising receiving (S100) an unlock message to a control unit (210), the message including an instruction to unlock the tool (100), unlocking (S110) the power tool (100) according to the instruction by the control unit (210) via an actuator unit (250), counting (S120) an authorization time period from reception of the first message to the control unit (210) by a counter (230), wherein when the counted authorization time period exceed a predetermined threshold, locking (S130) the power tool (100) by the control unit (210) via the actuator unit (250), thereby enabling prevention of unauthorized use of the power tool (100) by remote unlocking and locking.

14 Claims, 15 Drawing Sheets

Related U.S. Application Data application No. PCT/SE2016/050718, filed on Jul. 14, 2016, application No. 15/997,990, which is a continuation-in-part of application No. 14/737,810, filed on Jun. 12, 2015, now abandoned, which is a continuation of application No. PCT/SE2013/051595, filed on Dec. 20, 2013.

(60) Provisional application No. 61/740,712, filed on Dec. 21, 2012.

(51) Int. Cl.
*H04B 17/318* (2015.01)
*E05B 39/00* (2006.01)
*E05B 47/00* (2006.01)

(52) U.S. Cl.
CPC . *G07C 9/00896* (2013.01); *G07C 2009/0092* (2013.01); *G07C 2009/00769* (2013.01); *G07C 2209/63* (2013.01)

(56) References Cited

U.S. PATENT DOCUMENTS

| | | | | |
|---|---|---|---|---|
| 2008/0030325 A1* | 2/2008 | Fries | ............... | G06K 19/0701 340/539.32 |
| 2013/0127628 A1* | 5/2013 | Blaufuss | ........... | G06Q 10/0833 340/686.1 |
| 2013/0176107 A1* | 7/2013 | Dumas | ............... | G07C 9/00571 340/5.61 |
| 2015/0053144 A1* | 2/2015 | Bianchi | ............... | A01K 27/001 119/720 |

* cited by examiner

METHOD FOR LOCKING, UNLOCKING AND POSITIONING OF A TOOL

This application is a continuation-in-part of U.S. patent application Ser. No. 14/737,810 filed on Jun. 12, 2015, which is a continuation of PCT Application No. PCT/SE2013/051595 filed Dec. 20, 2013, which claims benefit of U.S. Provisional Application No. 61/740,712, filed Dec. 21, 2012, and priority to Swedish Application No. SE 1251511-0, filed Dec. 21, 2012; this application is also a continuation is part of U.S. patent application Ser. No. 15/876,156 filed on Jan. 21, 2018, which is a continuation of PCT Application No. PCT/SE2016/050718, filed 14 Jul. 2016, which claims the benefit of Swedish Patent Application No. SE 1551033-2, filed 21 Jul. 2015, the entire contents of which are hereby incorporated by reference. The entire contents of each one of the above-mentioned applications are hereby incorporated by reference.

TECHNICAL FIELD

The present disclosure relates generally to methods, nodes, computer programs and a power tool for enabling unlocking and locking of the power tool for the power tool to be tracked by a node and a system thereof and for prevention of unauthorized use of the power tool.

BACKGROUND

Entrepreneurs and construction companies are using various machines and tools on construction sites. This ranges from the self-employed carpenter performing a renovation of a cottage all the way to the large construction company building entire new hospitals, districts, highways, bridges and other major projects. The workers doing the construction uses all kind of tools from pencils and knifes all the way to excavators and cranes. When it comes to power tools, also frequently used by the construction workers, they may involve a significant value in combination with a compact format. Such tools may include electric driven tools, fuel/gasoline driven tools, pneumatic driven tools, hydraulic driven tools, not limiting to similar powered tools. Examples of power tools are: screwdrivers, bolt gun, nail gun, impact drill, angle grinder, cutter, saw, reciprocating saw, not limiting to other types of tools. Obviously a crane may represent a large capital value, but it is rather unpractical for the simple thief or the regular criminal organization to steal a crane. However, the power tool is easy to carry away and may represent a significant value on a market, or may be used for other criminal activities. This is a vast problem for construction companies, which power tools is being stolen or just disappears from construction sites. The lost tools costs money to replace drives insurance costs, and delays planned work.

Another problem is where owner of tools, for example tool rental companies, is to get rental returns of tools in time or according to an agreement.

Another problem, of a rather practical character, which yet may be troublesome, may be on a large construction site, to find tools being spread out over a large area or space.

In prior art there are many systems and solutions available for positioning of devices both for indoor and outdoor appliances. Examples are GPS, GLONASS, triangulation, roundtrip time measurements, and multiple radar solutions. Depending of the use each system is designed with different features in mind, for example power consumption, accuracy, and performance in different environments. GPS (Global Positioning System) is one of the most common systems available and provides a relatively good accuracy with a more or less worldwide coverage from satellites utilized for the system. Although great for outdoor positioning the GPS system has plenty of limitations both regarding coverage and power consumption. GPS systems and other similar systems such as GLONASS have difficulties both in large cities with tall buildings and indoor environments wherein the free view towards satellites is blocked or partly blocked. The problem is especially relevant for mobile devices both in indoor and outdoor areas that have limited battery capacity.

In prior art attempts to create other systems have resulted in other drawbacks, such as limited geographical coverage and bad accuracy.

Thus, it would be beneficial to provide a solution that addresses at least some of the aforementioned drawbacks.

SUMMARY

It is an object of the invention to address at least some of the problems and issues outlined above. It is possible to achieve these objects and others by using a method and an apparatus as defined in the attached independent claims.

Another object of the present invention is to provide a power efficient tracking system without compromising the geographical coverage.

Another object is to provide a security solution wherein a device or tool is tracked based on the need of tracking it.

Yet another object is to arrange a solution and system allowing for dual power mode positioning and/or tracking of a tool.

As used herein, node and tool control node are interchangeable terms. The same applies for the terms power tool, tool, and device which are describing the same parts of the inventive solution.

According to one aspect, a method is provided in a power tool for enabling unlocking and locking of the power tool for prevention of unauthorized use, the method comprising: receiving an unlock message to a control unit, the message including an instruction to unlock the tool, unlocking the power tool according to the instruction by the control unit via an actuator unit, counting an authorization time period from reception of the first message to the control unit by a counter, wherein when the counted authorization time period exceed a predetermined threshold, locking the power tool by the control unit via the actuator unit, thereby enabling prevention of unauthorized use of the power tool by remote unlocking and locking.

Further, a node is arranged for tracking a device, such as a tool, wherein the node is adapted to communicate through wireless communication in for example a frequency range between 300 and 1000 MHz and configured to transmit a position request to the tool, receive a position response from the tool, and calculate the distance to the tool. The node is configured to determine a first maximum distance between the node and the tool based on a predetermined signal strength threshold for distance calculations and transmit an alert to the tool if the distance between the node and the tool exceeds the first maximum distance.

It is one advantage with the present solution that it in one embodiment is adapted to communicate in a relatively low frequency range, i.e. between 300 and 1000 MHz. The low frequency range allows for enhanced coverage in areas with obstacles, such as walls or buildings. The reason for this is that frequencies in the range between 300 and 1000 MHz have better characteristics for penetrating building structures and other blocking objects than frequencies used for conventional data communication such as the WiFi frequencies 2.4 and 5 GHz. Furthermore, although the low frequencies limit the speed of data transfer, they allows for long distance communication in relation to the required energy level. Thereby, the solution provides good coverage for reasonably large coverage areas.

According to another aspect, a method is provided in a tool control node for enabling unlocking and locking of a tool for prevention of unauthorized use, the method comprising transmitting an unlock message to the tool, the message including an instruction to unlock the tool, counting an authorization time period from transmission of the unlock message to the tool, wherein when the counted authorization time period exceed a predetermined threshold, transmitting of a lock message including an instruction to lock the tool, thereby enabling prevention of unauthorized use of the tool by remote unlocking and locking.

According to another aspect, a power tool is provided adopted to enable unlocking and locking of the power tool for prevention of unauthorized use, the power tool adopted to receive an unlock message to a control unit, the message including an instruction to unlock the tool, unlock the power tool according to the instruction by the control unit via an actuator unit, count an authorization time period from reception of the first message to the control unit by a counter, wherein when the counted authorization time period exceed a predetermined threshold, lock the power tool by the control unit via the actuator unit, thereby enabling prevention of unauthorized use of the power tool by remote unlocking and locking.

The above methods, tool control node and power tool may be configured and implemented according to different optional embodiments. In one possible embodiment, the actuator unit is at least one of electrical switch, mechanical lock and semiconductor based switch. In another possible embodiment when a second unlock message is received before the predetermined threshold is reached, the counter is restarted, such that the power tool remains unlocked. In another possible embodiment the unlock message includes a first key, wherein, the first key is required by the control unit for authorization of the message. In another possible embodiment the drive unit requires at least one of the first key or a second key from the control unit, for enabling of the drive unit. In another possible embodiment a lock message is received by the control unit, the lock message including an instruction to lock the tool, wherein the tool is locked by the control unit via the actuator unit. In another possible embodiment a position message including an alert signal is received by the control unit, the position message including an instruction to repeatedly transmit a response signal as a response to the alert signal, thereby enabling positioning of the tool. In another possible embodiment the communication with the tool is encrypted. In another possible embodiment the tool has a physical tamper protection.

In another embodiment the positioning of the tool is instead made by the tool control unit. This could for example be done through means of a message including an alert signal is received by the control unit. The message triggers the control unit to transmit a signal requesting response signals from presence nodes nearby followed by receiving response signals to the control unit from presence nodes nearby and thereby enabling positioning of the tool. This allows for the positing to in one embodiment be made within the tool enabling for the tool to send a response comprising a position to for example the tool control node.

The node (and tool control node) can be any form of node, such as an access point, base station, mobile phone, smartphone, or any other form of node. It is another advantage with the present solution that the node handles the majority of calculations and computation for the tracking or positioning determination. Thereby it is possible to increase the battery life of the device significantly.

It is one advantage that the node calculates a distance to the device and determines a first maximum distance based on a predetermined signal strength threshold for distance calculations. Although the transmission rate and data amount for determining the distance to a device is low there is a requirement for the signal strength and quality of the transmission in order for the distance to be calculated with an acceptable accuracy. An advantage with the present solution is that the acceptable signal strength is lower for data communication than for distance determination which is utilized for dual power mode positioning as will be described further herein.

According to an embodiment the node further is configured to determine a second maximum distance between the node and the device based on a predetermined signal strength threshold for data communication.

It is one advantage with the present solution that the node further is configured to determine a second maximum distance, the second maximum distance being based on a signal strength threshold for data communication. Thereby, the second maximum distance is a longer distance than the first maximum distance based on that the maximum distance for data communication without losing information is longer than the maximum distance for distance measurements without losing crucial accuracy.

According to an embodiment of the node the position request comprises a request to wake up the device.

It is one advantage with the present solution that the position request in one embodiment comprises a request to wake up the device. The device can be any form of device adapted to be tracked by a node including but not limited to a tag, puck, phone, PDA, or any other form of device. However, in one embodiment the device is a tag adapted to host a long life battery with low capacity. The long life battery is adapted to provide the device with energy for a long time lasting through low energy consumption by the device. It is thereby one advantage that the device can be in a sleep mode almost all the time except for when a position request is received comprising a request to wake up the device.

According to an embodiment the node is further configured to use the first and second maximum distances to create geographic areas surrounding the node.

In one embodiment of the node it is one advantage that the node is configured to create geographic areas surrounding the node. The geographic areas created from the first and second maximum distances constitutes a first and second geographic area wherein the first geographic area is a geographic area wherein a device can be tracked by a node utilizing a low power tracking option as described in the appended claims. The low power tracking is in one embodiment conducted by the node transmitting a position request to the device with the communication means communicating between 300 and 1000 MHz. The node further receives a response to the position request and uses the time of flight, ToA, RSSI, or any other form of in the art known positioning technology to determine the distance to the device.

The geographic area is in one embodiment used to create a map for the user illustrating the area wherein the device can be located without alerts being created by the node.

According to one embodiment the node is further configured to enable a user to set the first maximum distance manually as long as it is lower than the predetermined signal strength threshold distance for distance calculations.

In one embodiment it is advantageous for a user to be able to set the first geographic area or the first maximum distance in order to limit the area wherein the device is allowed to be without an alert being created. The person skilled in the art understands that the geographic area in one embodiment may have another form than a circle.

According to one embodiment the node further comprises means for determining the direction of the signal.

In one embodiment node sends multiple signal to determine the direction wherein the signal strength is the strongest and thereby determining the direction to the device.

In one embodiment multiple antennas are installed on the node to enable the node to determine the phase of the received signal at each of the said antennas, thereby enabling the direction to the device to be determined.

In one embodiment wherein the node is a mobile unit, the mobile unit adapted to instruct a user to rotate the device using his or her body as a shield affecting the signal strength and thereby enable determination of the direction to the device.

In one embodiment wherein the node is a mobile unit, the mobile unit is adapted to instruct a user to move in a zig-zag pattern to enable multiple distance calculations between the mobile unit and the device, thereby enabling the mobile unit to determine the direction to the device.

According to one embodiment the node is further configured to enable a user to manually draw a geographic area wherein the geographic area has a regular or unregularly shape.

It is one advantage with the present solution that a user has the possibility to set the first maximum distance manually in order to decrease an area wherein the device is allowed to be without transmitting an alert. It is further more an advantage that only the first maximum distance is configured manually by the user in order for the second maximum distance to be usable to save as much energy as possible.

According to one embodiment the node is a mobile node. According to one embodiment is the node a smartphone. According to yet another embodiment the node is any form of fixed node, such as a base station or access point, or mobile node such as a mobile phone, tablet, PDA, or any other form of mobile node.

According to an aspect a device is arranged to be tracked by a node. The device is adapted to communicate through wireless communication in a frequency range between 300 and 1000 MHz, receive a position request from the node, and transmit a position response to the node. The device is further adapted to enable positioning means comprised in the device upon receiving an alert that the device is beyond a first maximum distance between the node and the device based on a predetermined signal strength threshold for distance calculations.

In one embodiment of the device as described herein the device is in a passive mode for most of the time in order to enhance the battery life of the device.

In one embodiment of the device the device is adapted to wake up upon receiving a positioning request.

In one embodiment of the device the positioning means is GPS, GLONASS, WiFi, or any other form of positioning means adapted to position a device in an area that is not geographically predetermined.

According to an embodiment the device is adapted to use said positioning means only if the device is beyond a second maximum distance between the node and the device based on a predetermined signal strength threshold for data communication.

It is one advantage that the device saves power by only using the positioning means if the device is out of positioning reach of the node. In one embodiment is the device further configured to not use the communication means at 300-1000 MHz for communicating with the node if the device is outside of the first and second geographic areas or beyond the second maximum distance and thereby outside of reach from the node.

According to one embodiment the device is adapted to send positioning information through its communication means at 300-1000 MHz with position information from the positioning means if the device is in the geographical area or at a distance between the first and second maximum distance and thereby out of reach for positioning from the node but within communication distance with the node.

According to an embodiment the device is adapted to wake up upon receiving the position request from the node.

According to an embodiment the positioning means is GPS (Global Positioning System) positioning means.

According to an embodiment the device initiates a request to wake up the node.

According to an aspect a system for tracking a device comprises a node and a device where each of the node and the device is adapted to communicate through wireless communication in a frequency range between 300 and 1000 MHz, and the node calculates the distance to the device through exchanging data over said wireless communication, the node determines a first maximum distance between the node and the device based on a predetermined signal strength threshold for distance calculations, the node transmits an alert to the device if the distance between the node and the device exceeds the first maximum distance, the device comprises positioning means, and the device is adapted to enable said positioning means upon receiving an alert that the device is beyond a first maximum distance between the node and the device based on a predetermined signal strength threshold for distance calculations.

According to an embodiment the first and second maximum distances are used to create geographic areas surrounding the node.

It is one advantage with the system for tracking a device that the system creates two geographic areas surrounding the node. The first geographic area represents an area wherein the device can be tracked by the node through data communication at 300-1000 MHz as described herein and in the appended claims. The second geographic area represents an area wherein the node can communicate with the device but the signal strength is lower than a threshold value required to track the device accurately.

According to an aspect in a node for tracking a device, wherein the node is adapted to communicate through wireless communication in a frequency range between 300 and 1000 MHz, and transmitting a position request to the device, receiving a position response from the device, calculating the distance to the device, determining a first maximum distance between the node and the device based on a predetermined signal strength threshold for distance calculations, and transmitting an alert to the device if the distance between the node and the device exceeds the first maximum distance.

According to an aspect in a device to be tracked by a node, wherein the device is adapted to communicate through wireless communication in a frequency range between 300 and 1000 MHz, and receiving a position request from the node,
transmitting a position response to the node,
the device further comprises positioning means and performs the step:

enabling said positioning means upon receiving an alert that the device is beyond a first maximum distance between the node and the device based on a predetermined signal strength threshold for distance calculations.

According to an aspect a computer program, comprising computer readable code means, which when executed in a node causes the node to perform the solution as described herein.

According to an aspect a computer program, comprising computer readable code means, which when executed in a device causes the device to perform the solution as described herein.

According to an aspect a computer program product, comprising computer readable medium and a computer program wherein the computer program is stored on the computer readable medium.

According to an embodiment the communication through frequencies between 300 and 1000 MHz is conducted over an ISM (Industrial, scientific, and medical) band.

In another embodiment a power tool control unit adopted to enable unlocking and locking of a tool for prevention of unauthorized use is adopted to:

transmit an unlock message to the tool, the message including an instruction to unlock the tool, determine the position of the tool and check if said tool is within a predetermined area, if the tool leave said predetermined area transmit a lock message including an instruction to lock the tool, thereby enabling prevention of unauthorized use of the tool.

The power tool control unit can further be configured to sound and transmit an alarm if said tool leaves the predetermined area.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

In the following, a detailed description of different embodiments of the node, device, method and, tracking system is disclosed under reference to the accompanying drawings. All examples herein should be seen as part of the general description and are therefore possible to combine in any way of general terms. Individual features of the various embodiments and aspects may be combined or exchanged unless such combination or exchange is clearly contradictory to the overall function of the disclosed node, device, method, and/or system.

Briefly described, a solution is provided to avoid theft of power tools and other capital intensive machineries related to construction sites. By having a lock on a power tool, which default is locked, it may be less attractive for theft. A lock which is remotely controlled. Only when a user is authorized by the owner of the tool, the tool is unlocked. The tool may be unlocked for a specific period of time. The tool may further be unlocked within a specific geographical or a specific volume. An unlock message may be transmitted from a tool control node, which instructs the power tool to be unlocked. The power tool is than unlocked and fully usable for a certain time period, before the time period has passed, a new unlock message must be received by the power tool, otherwise it will be locked for further usage. So if the tool does not receive any unlock message or, if the tool is outside a specified area, it will automatically be locked and unusable. An owner of a tool may for some reason want to revoke an authorization from a user to use the tool, for example if an invoice is not paid for. Than may the tool owner transmit a lock message to the tool, such it becomes unusable. The tool owner may delegate a right to transmit unlock and lock messages to an intermediate, a presence node. An example may be the tool rental company delegating to a site manager. Such right may also be revoked.

The solutions herein relates to a node (such as a tool control node), device (such as a power tool), method and, tracking system enabled for dual power mode positioning wherein the node and device are adapted to enable positioning, distance calculations, and/or tracking of the device through at least two different means of positioning or distance calculations. The solution solves the problem of improving the battery life of a device to be tracked by utilizing a low power means to determine the approximate position of the device most of the time, with a second higher power means providing additional position information to enable a more exact determination of position of the device when required.

Figure 1:
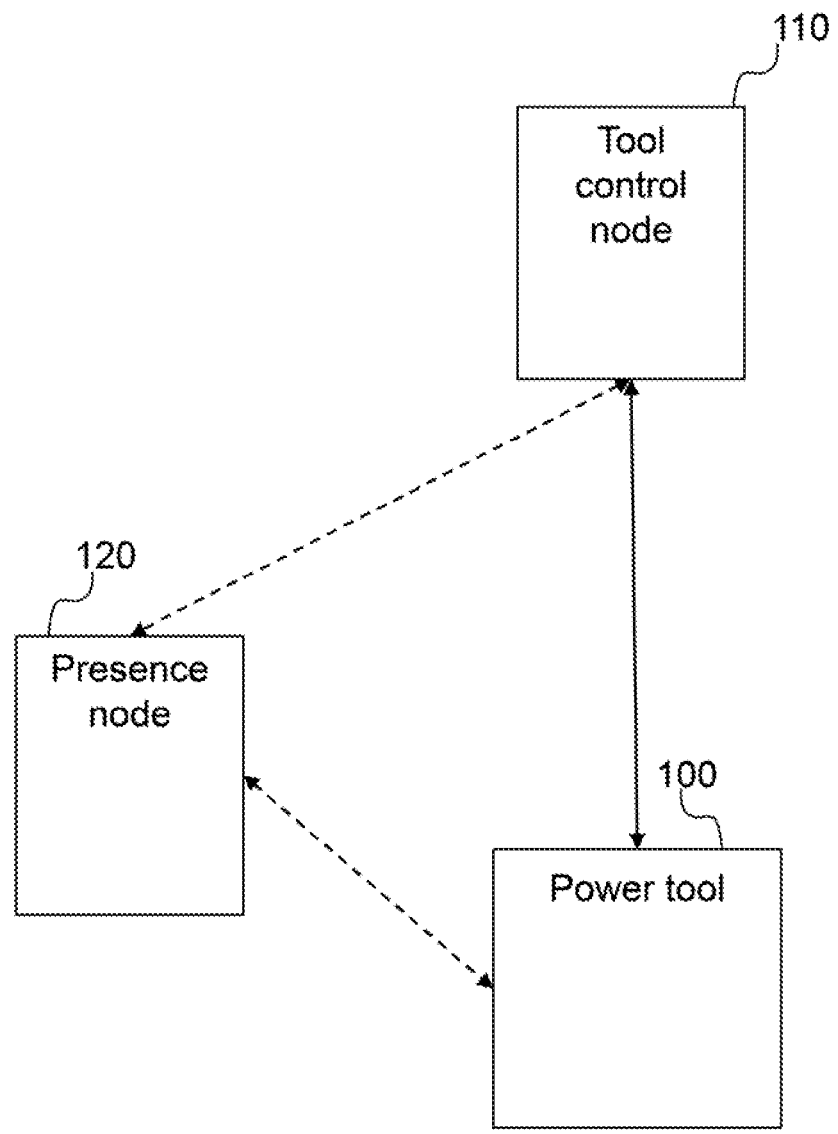
FIG. 1 is a block diagram illustrating the solution.

Now the solution will be described in more detail. FIG. 1 shows a block diagram with a power tool 100, a tool control node 110 for controlling power tools 100 and a presence node 120 for handling of delegated controlling of power tools 100.

Figure 2:
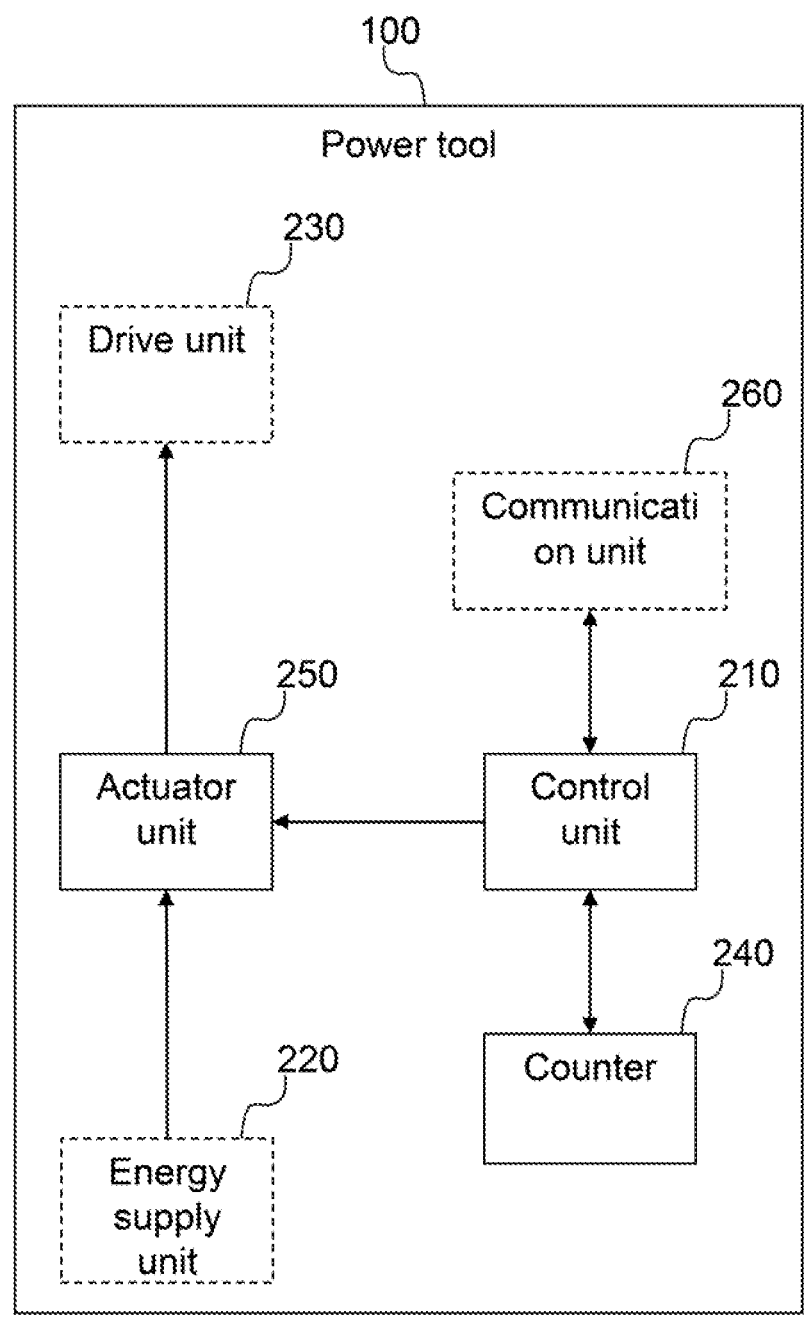
FIG. 2 is a block diagram illustrating a power tool.

FIG. 2 shows a block diagram of the tool 100. The tool includes a control unit 210 for controlling unlocking and locking of the power tool 100 and other actions. The power tool 100 further includes a counter 240 for counting of time. The power tool 100 further includes an actuator unit 250 for unlocking and locking of the power tool 100. The power tool may also include an energy supply unit 220, a drive unit 230 and a communication unit 260 for reception and transmission of messages.

Power tool may also be denoted "device", appliances, powered machine, not limiting to other similar suitable terms. Appliances may include washer, dryer, dishwasher, heat pump, stove, oven, microwave, not limiting to other appliances used in a home or office. Tool control node may also be denoted "remote node" not limiting to other similar suitable terms. Presence node may also be denoted "mobile node" not limiting to other similar suitable terms. A few examples of the tool control node 110 may be, a server in a communications network, a virtual server in a communications network, a mobile phone or an application installed on a mobile phone, a PDA (Personal Digital assistant) or an application installed on a PDA, not limiting to other similar nodes. A few examples of a presence node 120 may be a mobile phone or an application installed on a mobile phone, a PDA (Personal Digital assistant) or an application installed on a PDA, a gateway, access switch, access router, WLAN access point (Wireless Local Area Network) not limiting to other similar nodes. The term "unlock" may also be denoted "enable", and the term "lock" may also be denoted "disabled".

Figure 3:
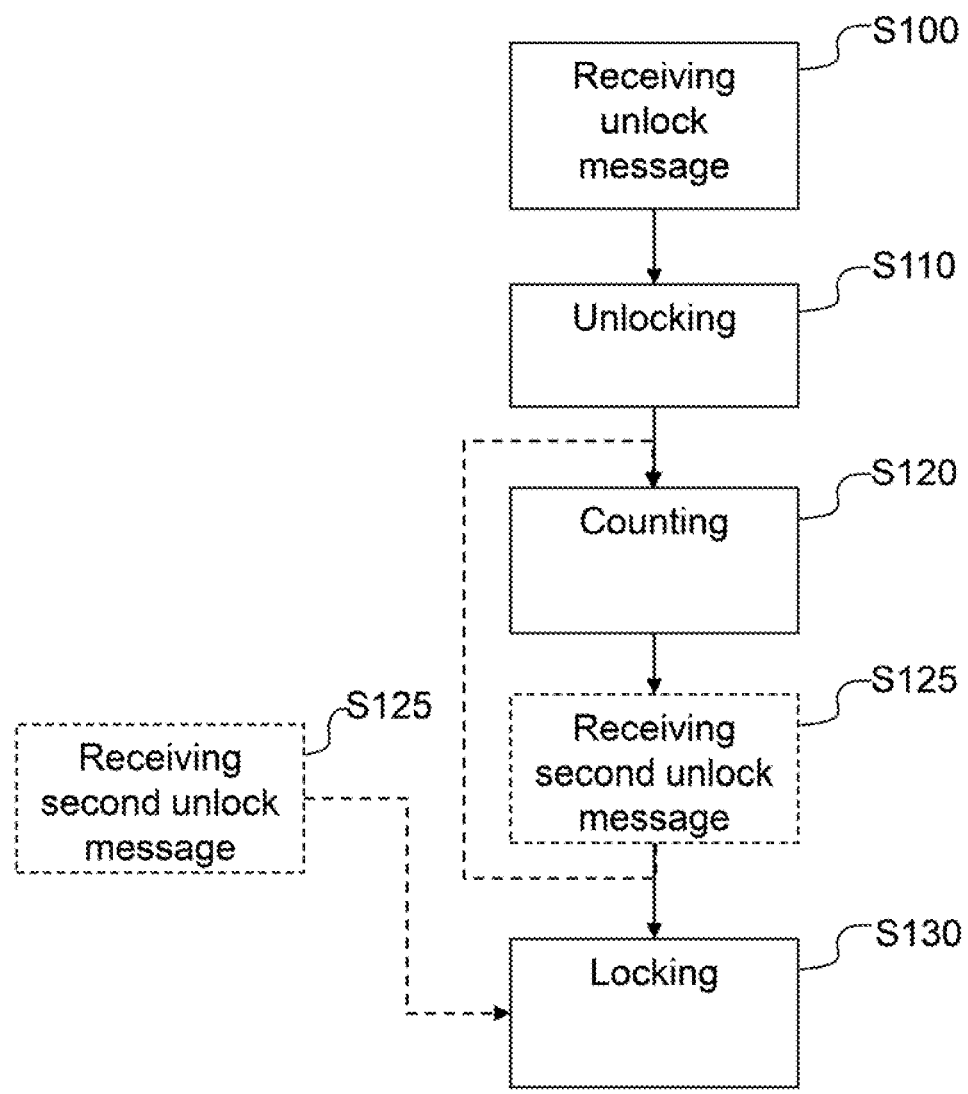
FIG. 3 is a flow chart illustrating a procedure in a power tool, according to possible embodiments.

FIG. 3 shows a method in a power tool 100 for enabling unlocking and locking of the power tool for prevention of unauthorized use. The method comprises receiving S100 an unlock message to a control unit 210, the message including an instruction to unlock the tool 100. The method further comprises unlocking S110 the power tool 100 according to the instruction by the control unit 210 via an actuator unit 250. The method further comprises counting S120 an authorization time period from reception of the first message to the control unit 210 by a counter 230, wherein when the counted authorization time period exceed a predetermined threshold, the power tool 100 is locked S130 by the control unit (210) via the actuator unit (250), thereby enabling prevention of unauthorized use of the power tool (100) by remote unlocking and locking.

The unlock message may come from a tool control node 110. The message may be carried via wireless radio communication, for example such as WiFi according to IEEE 802.11 (Institute of Electrical and Electronics Engineers), RFID (Radio-frequency identification), Bluetooth, not limiting to other similar communication methods. Protocols used for carrying the message may be Ethernet, TCP/UDP/IP (Transmission Control Protocol/User Datagram Protocol/Internet Protocol). Further examples of protocols which may be used are; SMTP (Simple Mail Transfer Protocol), SMS/MMS (Short Message Service/Multimedia Messaging Service), HTTP/HTTPS (Hypertext Transfer Protocol/Secure), SIP/SIPS (Session Initiation Protocol/Secure), not limiting to other suitable protocols for messages or communication with a power tool 100. The message with the unlock instruction may also include other information, such as a time stamp, or the length of the authorization time period, not limiting to other information. The authorization time period may be a time period during which the power tool 100 may be unlocked and prepared for normal operation. During the authorization time period, the power tool 100 may be outside radio contact with for example the tool control node 110. The counter 230 counts the authorization time period, such when the authorization time period exceeds the predetermined threshold the power tool 100 is locked. When the power tool 100 is locked it may not be possible to use for normal operation. The threshold may be adjusted, for example by manually setting a different value, or by reception of a different value via the unlock message or the lock message.

In an example of the solution, the actuator unit 250 may be at least one of electrical switch, mechanical lock and semiconductor based switch. Depending of the propulsion of the power tool 100 different kinds of locks may be more or less suitable. A combination of an electrical switch, mechanical lock and semiconductor based switch may be used for locking the power tool 100. In an example of the solution, when a second unlock message is received before the predetermined threshold is reached, the counter 230 may be restarted, such that the power tool 100 remains unlocked. By this action, the power tool 100 may be used in normal operation without interruption. Unless the counter 230 is restarted by for example a second unlock message, the power tool 100 may be locked from normal operation. In an example of the solution, the unlock message may include a first key, wherein the first key may be required by the control unit 210 for authorization of the unlock message. By usage of the first key, it may be possible to authorize the unlock message or any other messages received by the tool 100. Thereby may the power tool 100 be enabled to protect itself from receiving or taking any actions based on unauthorized messages.

In an example of the solution, the drive unit 230 may require at least one of the first key or a second key from the control unit 110, for enabling of the drive unit 230. If the power tool for example has been stolen, and the control unit is replaced with a modified control unit, the power tool may then be prevented from unauthorized usage, because the drive unit may expect a correct key before propulsion of the power tool 100. In an example of the solution, a lock message may be received by the control unit 210, where the lock message may include an instruction to lock the tool 100, wherein the tool 100 may be locked by the control unit 210 via the actuator unit 250.

In an example of the solution, a position message including an alert signal is received by the control unit (210), the position message including an instruction to repeatedly transmit a response signal as a response to the alert signal, thereby enabling positioning of the tool (100). When a power tool 100 is missing, because it has been lost/misplaced or stolen, it may then be possible to position the tool. By the power tool 100 transmitting the response signal, it may then be possible to determine a distance to the power tool 100. It may also be possible to determine a direction to the power tool 100. It may also be possible to determine a position of the power tool 100. In an example of the solution showed in FIG. 4, the power tool 100 may be arranged to receive an alert signal from the control node 110. The alert signal may include an identification of the power tool 100, alerting the power tool 100 by matching the received identification with a preprogrammed identification of the power tool 100, transmitting a response signal to the alert signal, including the identification of the power tool 100 matching the received identification, thereby enabling determination of the position of the power tool 100. In an example, the power tool 100 is adapted to repeatedly transmit the response to the alert signal. Hereby, a risk that for instance a control node 110 does not receive the response due to poor signal strength/connectivity resulting e.g. from the position of the power tool 100 or the presence node 120 may be reduced. Another advantage may be, if the power tool 100 changes locations, it may be possible to determine the new position.

Figure 5:
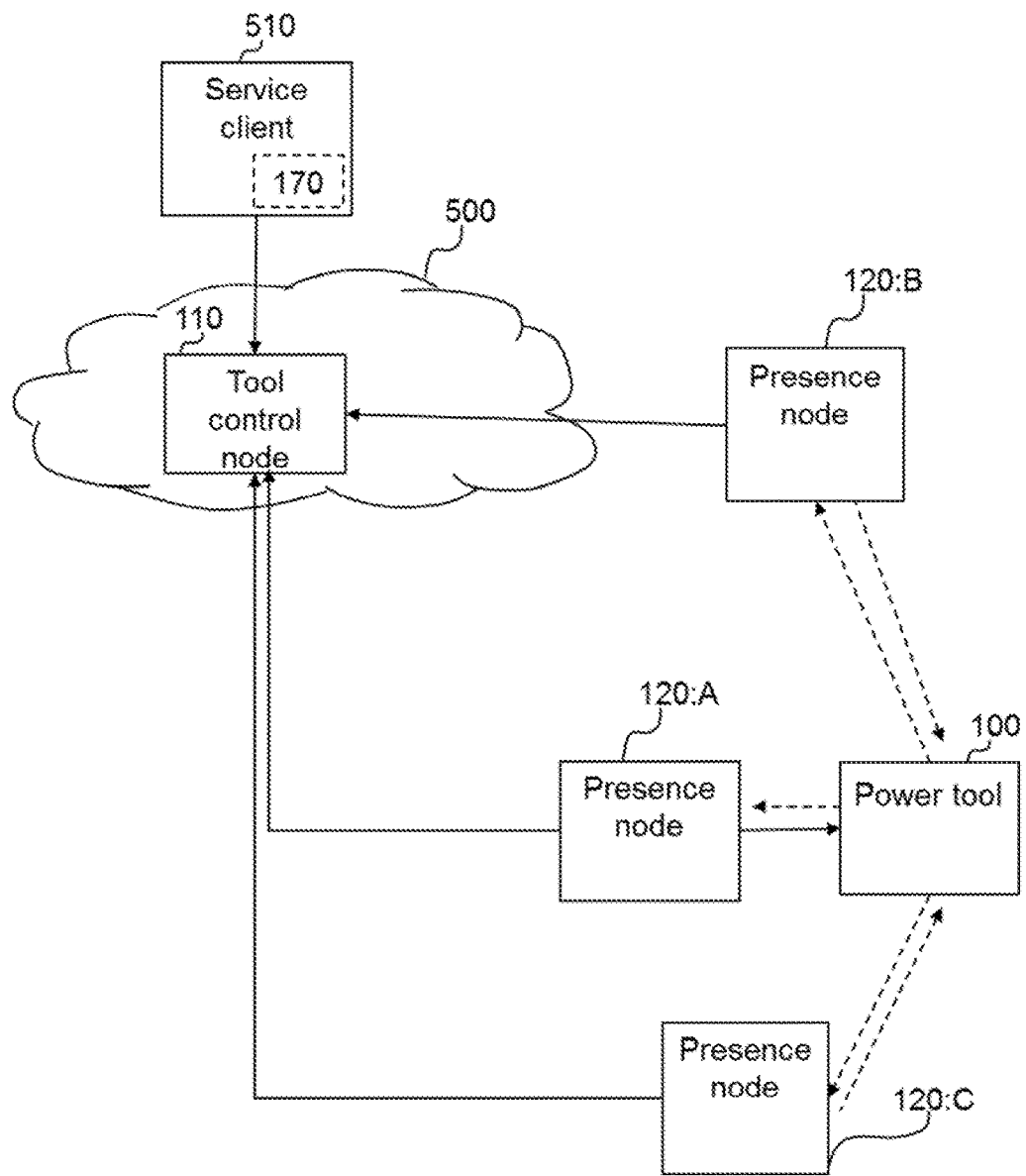
FIG. 5 is a communication scenario illustrating the solution, according to further possible embodiments.

FIG. 5, shows an overview of the solution from a positioning perspective, comprising a plurality of presence nodes 120. The solution may further comprise a tool control node 110 comprising for instance a presence node 120. The control node 110 is arranged to transmit a positioning request message, including an identification of the power tool 100, to a plurality of presence nodes 110. Such plurality of presence nodes may be a closed user group of users which have agreed to use a specific service, a random group of presence nodes 120 located in the vicinity of the control node 110, an open user community which users may subscribe to, an ad hoc network, or a meshed network, or similar. The control node 110 is further arranged to receive at least one response to the positioning request message, including a calculated distance to the power tool 100 from the presence node 120, and a position of the presence node 120 as well as determining a position of the power tool 100 by calculation of the distance of the power tool 100 from the presence node 120 in combination with the position of the at least one presence node 100. In an example of the solution, the control node 110 may be arranged to calculate the position of the power tool 100 using any of triangulation, multilateration or trilateration upon receiving responses to the position request message from a plurality of presence nodes 120. According to an embodiment, the control node 110 is hosted by a presence node 120, i.e. the control node 110 may itself be used to the determined the position of the power tool 100.

In an example of the solution, the communication with the power tool 100 may be encrypted. By encryption of the communication between power tool 100 and other nodes, unauthorized access to the power tool 100 may be prevented, as well as man-in-the-middle types of attacks. In an example of the solution, the tool 100 may have a physical tamper protection. A physical tamer protection may prevent or reduce the risk of unauthorized physical access to the power tool 100. The physical tamer protection may also prevent or reduce the risk of unauthorized physical access to key components of the power tool 100.

Figure 6:
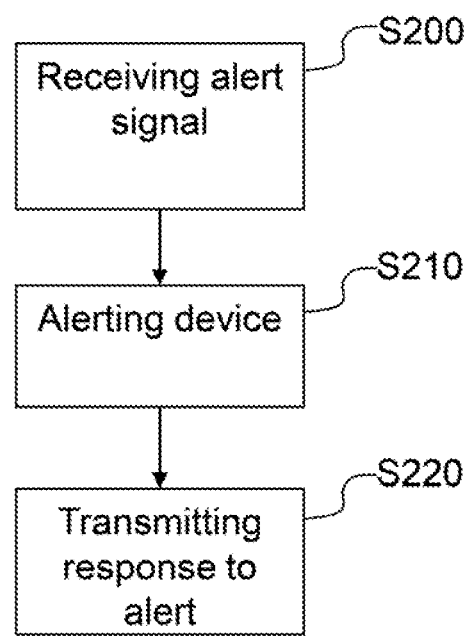
FIG. 6 is a flow chart illustrating a procedure in a tool control node, according to possible embodiments.

FIG. 6 shows a flowchart of a method in a tool control node 110 for enabling unlocking and locking of a tool for prevention of unauthorized use. The method comprises transmitting an unlock message to the tool 100, where the message includes an instruction to unlock the tool 100. The method further includes counting an authorization time period from transmission of the unlock message to the tool 100, wherein when the counted authorization time period exceed a predetermined threshold, the method further comprises transmitting of a lock message including an instruction to lock the tool (100), thereby enabling prevention of unauthorized use of the tool 100 by remote unlocking and locking.

In an example of the solution, when a use time period end may be beyond the authorization time period end, a second unlock message may be transmitted to the tool 100 before the predetermined authorization time period threshold is reached, such that the power tool 100 remains unlocked. The authorization time period may for example be 24 hours, i.e. a power tool 100 may be used for up to 24 hours, and at the end of the 24 hours the power tool 100 may be locked from normal operation, unless a second unlock message may be transmitted from the tool control node 110 to the power tool 100. The authorization period may be in a range from seconds up to days or weeks, depending on practical implementation.

The use time period may be a time period of an intended use period on a construction site, for example a month. The use period may be in a range from single hours up to months or even years. A use time period may be possible to interrupt, or change to a shorter or longer period. An example is where a customer of a rented power tool 100, may want to extend the rental period, or when a customer not has paid invoices, then the use time period may be extended, or interrupted. In the invoicing case, an unlock message may be transmitted from the tool control node 110 to the power tool 100, when the invoice is paid, such that the rental customer then may continue to use the power tool 100 under normal operation.

Figure 4:
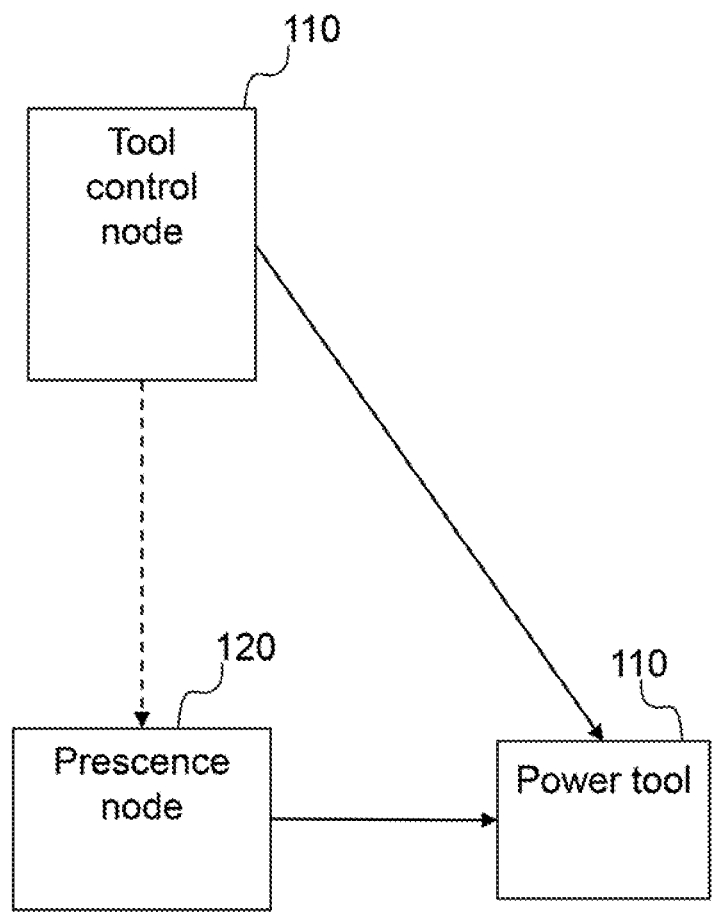
FIG. 4. is a signaling diagram illustrating an example of a delegation when the solution is used, according to further possible embodiments.

In an example of the solution, for example illustrated in FIG. 4, a position message including an alert signal may be transmitted to the power tool 100, thereby enabling positioning of the tool (100).

In an example of the solution, a delegated authorization to transmit unlock and lock messages to a specified power tool (100) message including the instruction to unlock the tool (100) may be transmitted to a presence node (120). FIG. 5 shows the tool control node 110, which may transmit the delegation to one of or all of the presence nodes 120:1, 120:B, 120:C. FIG. 5 also illustrated how the presence nodes 120:1, 120:B, 120:C may cooperate for positioning of a missing power tool 100. In an example of the solution, an annulation of the delegated authorization may be transmitted to the presence node (120).

The power tool 100, for example illustrated in FIG. 2, is adopted to enable unlocking and locking of the power tool 100 for prevention of unauthorized use. The power tool 100 is adopted to receive an unlock message to the control unit 210, where the message includes an instruction to unlock the tool 100. The power tool 100 is further adopted to unlock the power tool 100 according to the instruction by the control unit 210 via the actuator unit 250. The power tool 100 is further adopted to count an authorization time period from reception of the first message to the control unit 210 by the counter 230, wherein when the counted authorization time period exceed a predetermined threshold, the power tool 100 is locked by the control unit 210 via the actuator unit 250, thereby enabling prevention of unauthorized use of the power tool 100 by remote unlocking and locking.

FIG. 1 and FIG. 5 et. al. shows the tool control node 110 adopted to enable unlocking and locking of a tool for prevention of unauthorized use. The tool control node 110 is adopted to transmit the unlock message to the tool 100, the message including an instruction to unlock the tool 100. The tool control node 110 is further adopted count the authorization time period from transmission of the unlock message to the tool 100, wherein when the counted authorization time period exceed a predetermined threshold, tool control node 110 is adopted to transmit the lock message including an instruction to lock the tool 100, thereby enabling prevention of unauthorized use of the tool 100 by remote unlocking and locking.

Figure 7A:
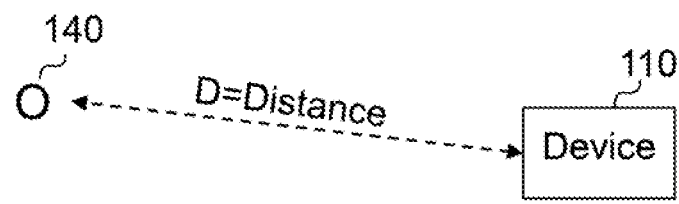
FIG. 7A-C are illustrations of positioning scenarios for a power tool.
Figure 7B:
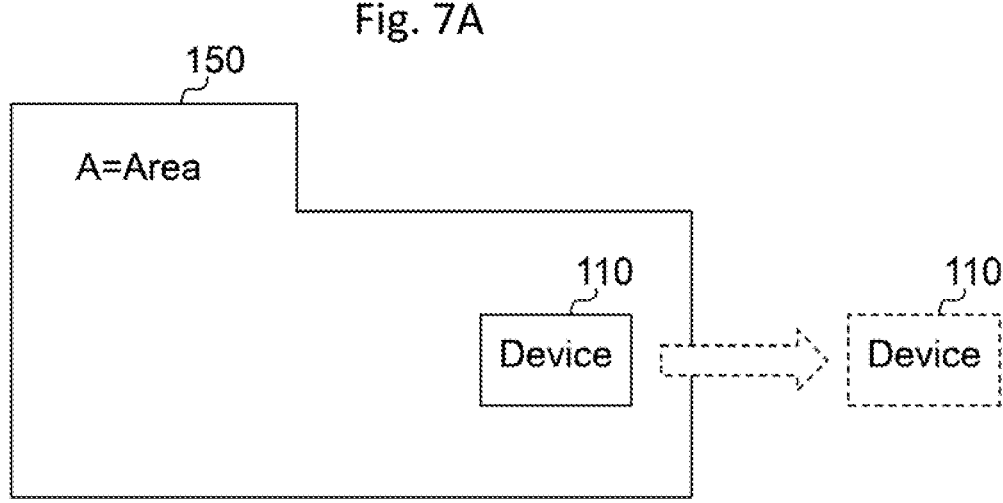
Figure 7C:
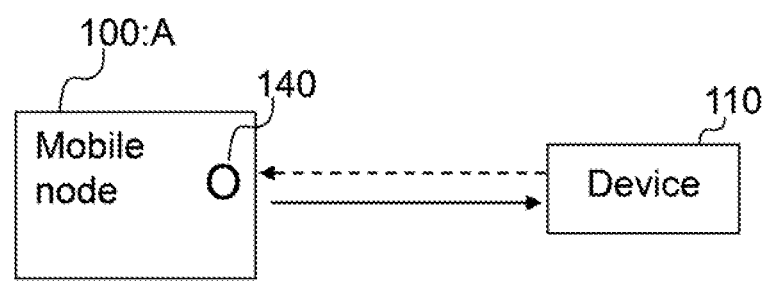

FIG. 7A shows a block diagram over a situation wherein a power tool 100 is at a certain distance from a geographical point 840. The tool control node 110 may be arranged to determine whether the position of the power tool 100 is within a predefined distance D from the geographical point 840, or if the power tool 100 is outside the predetermined distance. According to one embodiment shown in 7B, the tool control node 110 determines the position by comparing the position of the power tool 100 with a set geographical point 840 and calculates the distance between them. According to another embodiment as is further disclosed in FIG. 7C, the geographical point 840 is defined by the location of a presence node 110. The position of the presence node 110 may be dynamic.

Figure 8:
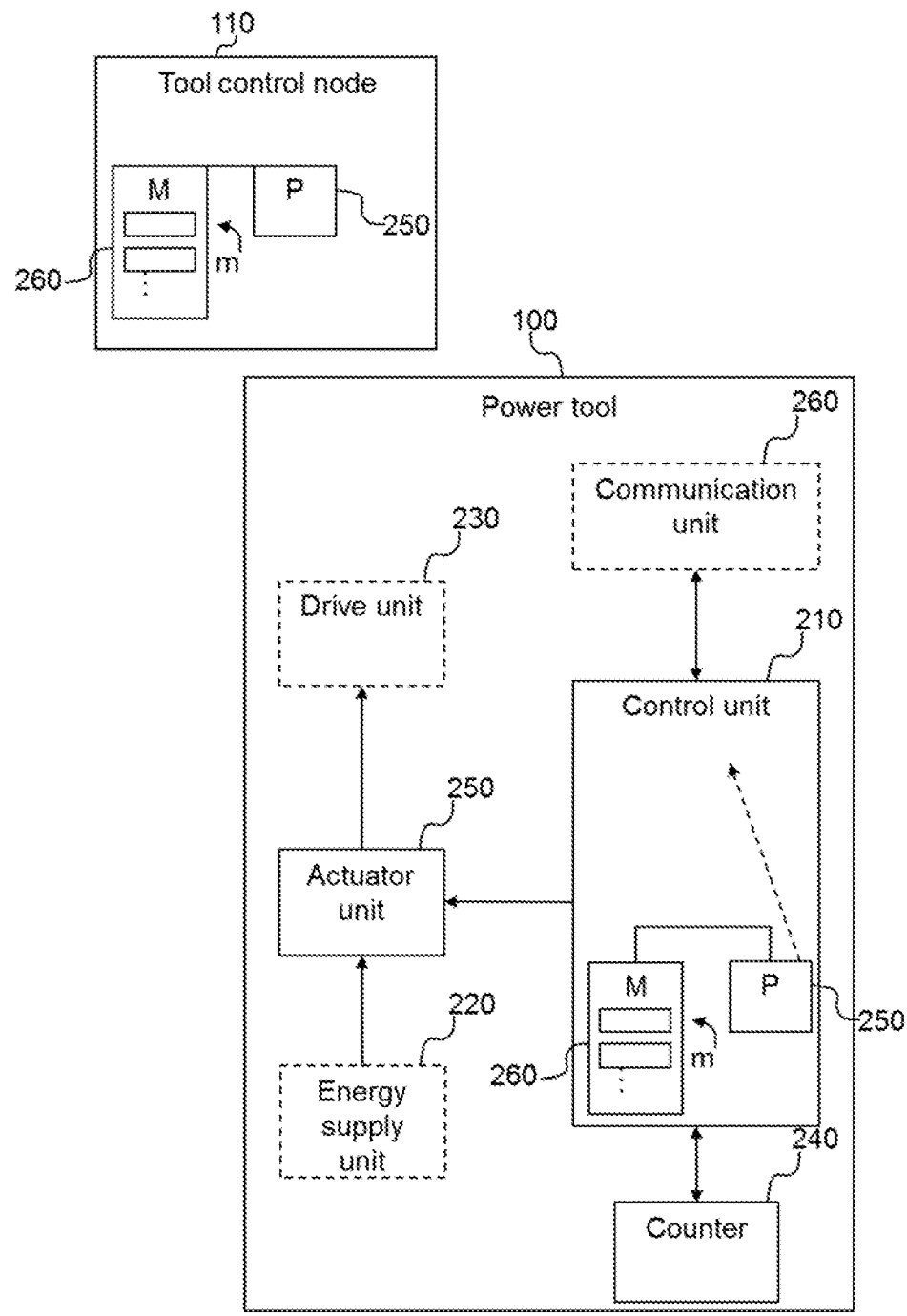
FIG. 8 illustrates examples of computer implementations.

Now looking at FIG. 8. The power tool 100 and the tool control node 110 described above may be implemented, by means of program modules of a respective computer program comprising code means which, when run by processor "P" 250 causes the power tool 100 and the tool control node 110 to perform the above-described actions. The processor P 250 may comprise a single Central Processing Unit (CPU), or could comprise two or more processing units. For example, the processor P 250 may include general purpose microprocessors, instruction set processors and/or related chips sets and/or special purpose microprocessors such as Application Specific Integrated Circuits (ASICs). The processor P 250 may also comprise a storage for caching purposes.

Each computer program may be carried by computer program products "M" 260 in the power tool 100 and the tool control node 110, shown in FIG. 1, 2, 4, 5, et al, in the form of memories having a computer readable medium and being connected to the processor P. Each computer program product M 260 or memory thus comprises a computer readable medium on which the computer program is stored e.g. in the form of computer program modules "m". For example, the memories M 260 may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the power tool 100 and the tool control node 110.

In an example embodiment of the solution the technology could be used for authorization in relation to other purposes than theft prevention. Some power tools requires special skills from the operator and should therefore not be handled by any user, one example is a woodwork-class for educational purpose where some machines in the class room might be locked to a presence node 110 possessed by the teacher, hence preventing students from using machinery while the teacher is not in the vicinity. Another example is for use in DIY (do it yourself) tools for home users where the technology could be adapted as, for example, a child look, allowing parents to store the power tools in areas were children potentially could locate them.

In the following a few examples of positioning techniques is described. The examples are for illustration of how a power tool 100 may be determined in direction, distance, and/or position. These examples are not limiting other techniques to be used.

Closest presence node 120. The most basic of the location determination techniques, is to identify the location based on the presence node 120 that is closest to the power tool 100. This may be done by looking at the association between the power tool 100 and the presence node 120 or by measuring signal strength.

Calculation of the approximately distance between the power tool 100 and one or more presence nodes 120. This technique is called lateration. The distance may be calculated based on signal strength or timing information.

Received Signal Strength Indication (RSSI)—Signal strength is a measurement on how strongly a transmitted signal is being received at a particular distance from the transmitter. The signal strength varies with distance, obstacles and interfering radio frequency signals. Multi path fading also affect the signal strength. In Wi-Fi networks, the signal strength is defined as Received Signal Strength Indication (RSSI). RSSI may be measured by the presence node 120 Link Quality Indicator (LQI) is a metric of the current quality of the received signal. The LQI may provide an estimate of how easily a received signal may be demodulated by accumulating the magnitude of the error between ideal constellations and the received signal over the 64 symbols immediately following the sync word.

Time Difference of Arrival (TDoA, also time of flight)—Distance may be calculated based on signal propagation time. Radio waves travel at a known speed through the wireless medium. Thus, if the time of transmission and time of signal arrival are known, the distance may be computed. Time Difference of Arrival (TDoA) is an example of such a technique. In TDoA, the position may be computed based on the difference in time when the signal arrives at different presence nodes 120.

Angle (AoA)—Instead of timing information, angles may be used to calculate the position. At each access point, the wireless signal arrives at a certain angle. By using geometric relationships between the angles of arrival at two presence nodes 120, the estimated location may be computed.

Triangulation and Trilateration,—When the location is estimated based on angle measurements from three or more presence nodes 120 the method is referred to as triangulation. The signal strength or timing information from several access points may also be used together to form coverage circles and intersection points. If the distance from at least three different presence nodes 120 may be calculated, this technique is known as trilateration. With the use of algorithms, the power tool 100 most likely position may be pointed based on the information from the different presence nodes 120. The more presence nodes 120 that contribute in computing the location, the more likely it is to get an accurate approximation.

Location Patterning—None of the above position determination techniques take into account signal propagation characteristics, such as reflection, attenuation and multi-path fading. However, with the location patterning technique, such characteristics of the actual wireless medium considered in the position computation. This location patterning technique may need calibration, in order to record how the wireless signals propagate throughout the environment. During this calibration phase, RF characteristics and real world data regarding how obstacles affect the propagation may be collected and pre-stored in a database. This information may then be compared with real-time information from the presence nodes 120 to achieve a more accurate position approximation.

Multiple Range Estimation Locator MREL (Multiple Range Estimation Location) used with Andrews Location Measurement Units (LMUs). MREL may use the transmission time and the time of arrival of the signal to determine a circular range ring, where the power tool 100 may be located. The location may then estimated by the best intersection of the multiple range-rings. Conversely, TDoA calculates the difference in the time of arrival of the mobile signal between multiple pairs of receivers. The differences in arrival time determine hyperbolic curves between receivers of where the power tool 100 may be. The location may then be estimated by the best intersection of the multiple hyperbolic curves.

In an embodiment, distance or position may be determined by usage of at least one of: association or signal strength, timing information, Received Signal Strength Indication (RSSI), Link Quality Indicator (LQI), Time Difference of Arrival/Time-of-Arrival (TDoA/TOA), Angle (AoA), Triangulation and/or Trilateration, Location Patterning, Multiple Range Estimation Locator MREL (Multiple Range Estimation Location), in combination with anyone else of the mentioned solutions.

Figure 9:
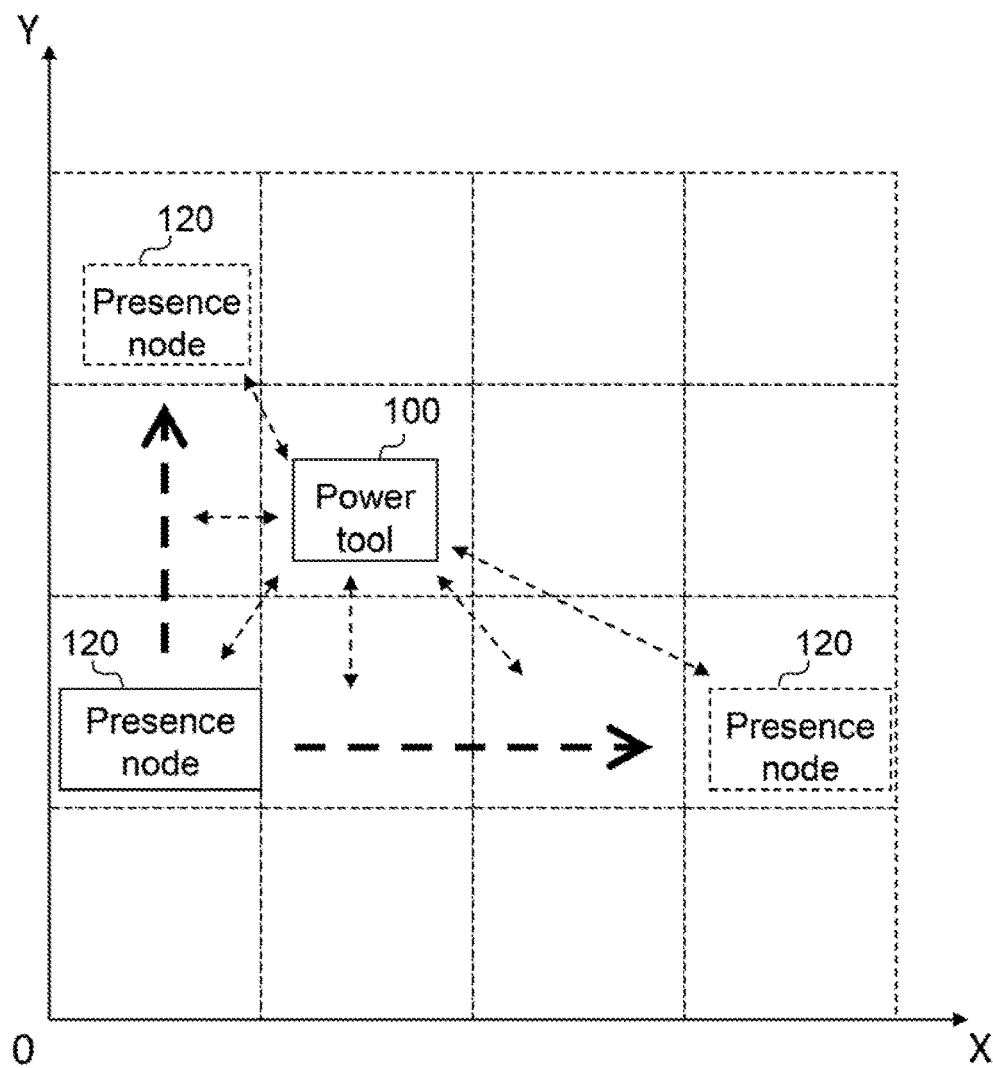
FIG. 9 shows an illustration of relocation of a presence node.

FIG. 9 illustrates an embodiment of the solution. A presence node 120 may be relocated to different positions. The different positions may be represented in a coordinate system. An example is where the start point of the presence node 120 is determined as coordinate "0". When the presence node 120 is relocated and at each point where a signal is received from the power tool 100, the new coordinate is determined. There by it may be possible to by usage of one presence node 120 simulate a plurality of presence nodes 120, where the simulated plurality of presence nodes 120 may better determine a position of a power tool 100, than a single presence node 120. A presence node 120 may determine its coordinate by use of GPS, etc. The presence node 120 may also determine a relative coordinate by usage of for example one of gyro, magnetic compass, accelerometer, tilt sensor, gyroscope, altimeter, not limiting to other type of sensors for measuring movements and/or relative positions.

In an embodiment, not shown in FIG. 9, the coordinate system may be a three dimensional coordinate system, such when a presence node 120 is relocated and during the relocation determines three dimensional coordinates for each signal received from the power tool 100.

A user of a presence node 120 may by moving around, simulate a group of users where each user has a presence node 120, thereby it may be possible to better determine a position of a power tool 100 than with a single presence node 120 stationary at one point.

In an embodiment, the time difference of arrival is measured by the power tool 100, instead of the presence node 120. An illustrative example is where at least one presence node 120 transmits a signal, such an alert signal or any other signal, such that the power tool 100 may measure the time of flight from the presence node 120 to the power tool 100. The power tool 100 may transmit the response to the alert signal, or any other signal, the response including the identification of the power tool 100 and also the measured transmission time between the presence node 120 and the power tool 100. The power tool 100 may additionally, based on the measured transmission time between the presence node 120 and the power tool 100, determine the distance between the presence node 120 and the power tool 100. The response transmitted by the power tool 100 may then include: identification of the power tool 100, measured transmission time between the presence node 120 and the power tool 100, and the determined distance between the presence node 120 and the power tool 100. In an embodiment, the time may be measured with an accuracy down to microseconds. In another embodiment, the time may be measured with an accuracy down to nanoseconds.

There may be advantages with the power tool 100 measuring the time of arrival, time difference of arrival or time of flight, instead of the presence node 120. An advantage may be that the power tool 100 may be easier to adopt for measuring the signals time of flight, than adopting the presence node 120 for measuring the time. Another advantage may be that the power tool 100 may be adapted to measure time with a better accuracy. Another advantage may be that by performing measurement in the device, more presence nodes 120 may participate in positioning a power tool 100 with a better accuracy then only presence node 120 with support for measuring the time. Another advantage with measuring time in the power tool 100 is that a plurality of additional sources for determination of the distance between a mobile terminal and a power tool 100 may enable avoidance of signal reflections and other disturbances.

In a situation where there is a plurality of presence nodes 120, the power tool 100 may transmit a response to each presence node 120, from which the power tool 100 has received a valid identification. The response may include any of: the identification, measured transmission time, and determined distance. The plurality of presence nodes 120 may better determine the position of the power tool 100.

The presence nodes can further be utilized for positioning of tools through Time of Arrival. Such positioning is not limited to pear-to-pear networks and can thereby be any form of network communication, comprising other network communication units such as for example access points.

According to one aspect of the present solution, a method is provided wherein a first node for determining the distance between two nodes in a communication network utilizes the media access control layer (MAC-layer) present in multiple standards, such as the IEEE 802.11x standard.

It has been shown that network communication conducted within the MAC-layer without the involvement of higher level layers provide processing times that are relatively constant. The MAC-layer is adapted to communicate the information of high level layers as one of its tasks but some frames can be transmitted standalone by the MAC-layer. By utilizing those frames, and/or, modifying behavior of a MAC-layer in a wireless communication network by adding additional features, processing times can be changed from an unreliable and changeable time factor to an approximated constant. The possibility to approximate the processing time makes it possible to subtract the processing time and utilize Time of Arrival/Time of Flight measurements. The methods described below thereby provide an enhanced system for determining the distance between two nodes in a communication network by significantly reduce the problem of previous methods.

This can be done in an open user community, as previously described, wherein users subscribes to, an ad hoc network, or a meshed network, or similar. Such method can for example be conducted in a first presence node adapted for determining the distance between said first presence node and a second presence node in a wireless communication network. The first presence node comprises a network communication unit with a medium access control layer (MAC-Layer), and the first presence node performs a method comprising the steps:

transmitting a response request message,
starting a first counter at transmission of said response request message,
receiving a response to said response request message,
stopping the counter at reception of the response to said response request message, determining based on the counter result the distance between said first and second presence node,
wherein
said counter result is the period from transmission of said response request message to the arrival of said response in the medium access control layer (MAC-Layer) of said first presence node network communication unit.

Positioning could also be accomplished through nodes in a wireless communication network, comprising a network communication unit with a medium access control layer (MAC-Layer), said node configured to calculate the Time of Arrival and/or Time of Flight based on a counted time from transmission of a response request message in the medium access control layer of said node to the corresponding arrival of a response to said response request message in the medium access control layer (MAC-Layer) of said node.

The counter can in one embodiment count processor cycles based on for example a central processing unit clock frequency. It is further understood that the counter can be any means arranged in a node, or attached hardware or software, which can directly or indirectly be used to determine a passed time.

For enablement of positioning determination through Time of Arrival based on MAC-Layer communication, an additional clock may be added to at least one node in a wireless communication network that uses a higher clock frequency than the standard clock. For example, in an IEEE 802.11x wireless communication network system the 1 MHz clock frequency may be complemented with an additional clock that provides better resolution for distance determination. In a preferred embodiment is such a complementary clock arranged with a frequency at 30-50 MHz, 50-500 MHz, 100 MHz or higher, or approximately 40 MHz.

RTS and CTS messages are handled in the MAC-layer of a network communication unit structure and thereby have the advantage of relatively stable processing times. This applies not only between different version of the same node but also between different sorts of nodes, such as mobile phones, access points, Wi-Fi-tags, etc. Furthermore, RTS and CTS messages are part of some wireless network communication standards and are thereby always present in devices following those standards.

For the determination of the position, wireless communication networks, such as for IEEE 802.11x, Bluetooth, ZigBee, or any other wireless communication network can be used. For example, a first presence node transmits a Request-to-Send message (RTS) and a second presence node response with a Clear-to-Send message (CTS) before any data is transferred. The RTS and CTS messages may be handled in the MAC-Layers of both the first presence node and the second presence node and may be thereby not affected of processing times in the CPUs of the nodes. The Time of Arrival/Time of Flight can thereby be calculated and used for distance determination and positioning.

It is further understood that different frequencies could be used. For example could frequencies from 400 MHz up to 5.5 GHz preferably be used in different embodiments of the invention.

While the solution has been described with reference to specific exemplary embodiments, the description is generally only intended to illustrate the inventive concept and should not be taken as limiting the scope of the solution. For example, the terms "power tool", "appliances", "presence node" and "tool control node" have been used throughout this description, although any other corresponding nodes, functions, and/or parameters could also be used having the features and characteristics described here. The solution is defined by the appended claims.

Figure 10:
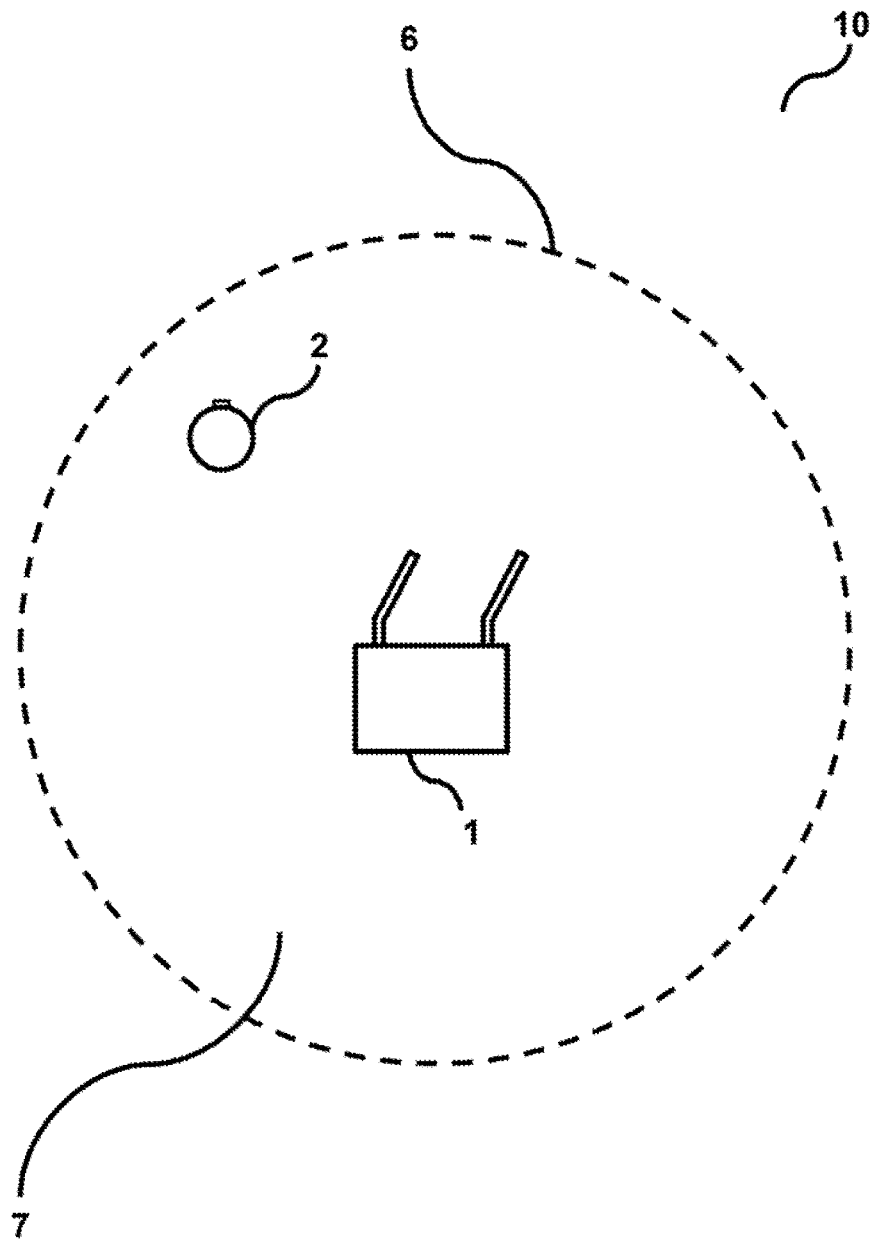
FIG. 10 illustrates an embodiment of the system for tracking a device comprising a node and a device, wherein a first distance has been calculated and a geographic area created.

FIG. 10 illustrates one embodiment of the tracking system, device, and node wherein a first geographic area 7 has been created based on a first maximum distance 6 calculated from a predetermined threshold value for signal strength. The first maximum distance 6 constitute the distance boundary for which the node 1 may successfully and with good accuracy track the distance to the device 2. In one embodiment is the first maximum distance 6 decided manually by a user. In another embodiment is the first maximum distance 6 means for creating a first geographic area 7, the first geographic area being drawn or created manually by a user. The person skilled in the art understands that the first geographic area 7 can be any form of geographic area 7 created automatically or by a user as long as the entire geographic area 7 is within the boundary created by the first maximum distance 6.

FIG. 10 further illustrates a device 2 which is located within the first geographic area 7. The device 2 can be any type of device 2 including but not limited to a tag, puck, mobile device, smartphone, or any other form of device to be tracked. In one embodiment the device 2 is an embedded device 2 being part of another object, such as a bicycle, boat, jacket, or a power tool.

Figure 11:
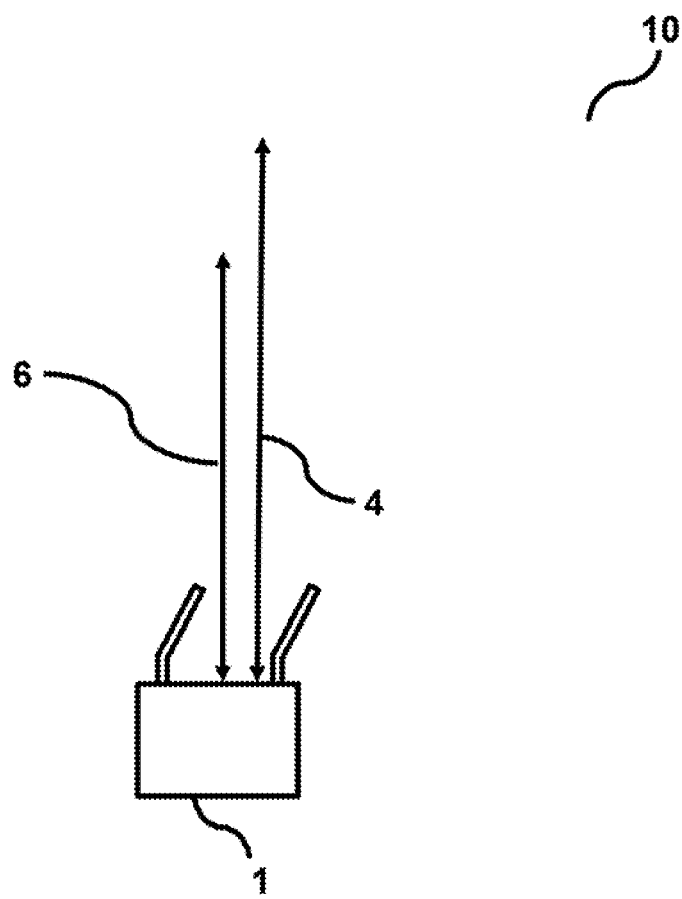
FIG. 11 illustrates an embodiment of the system for tracking a device comprising a node, wherein a first and second distance have been calculated.

FIG. 11 illustrates the first 6 and second 4 maximum distances from the node 1 in a system 10. The system 10 may comprise any number of nodes 1 and devices 2 as will be made clear in relation to FIG. 5 below.

The first 6 and second 4 maximum distances are in one embodiment not constant distances in relation to the distance to the node 1. For example, depending of the environment surrounding the node 1 the signal strength threshold might vary depending of objects in the way of the signal etc.

FIG. 11 further illustrates the node 1 clearly. The node 1 can be any form of node 1, such as a mobile node, smartphone, base station, base unit, access point, or any other form of node suitable for the system 10.

Figure 12:
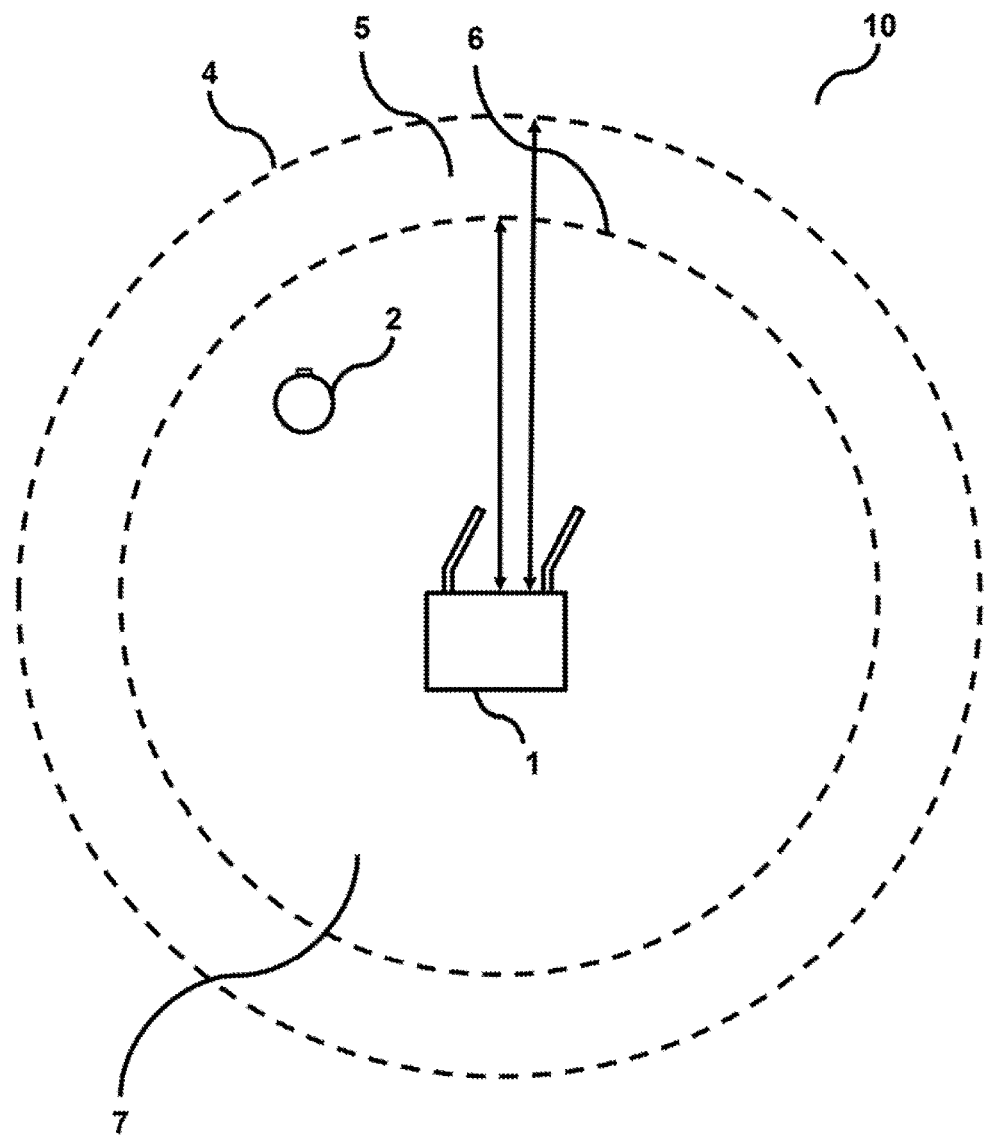
FIG. 12 illustrates an embodiment of the system for tracking a device comprising a node and a device, wherein geographic areas have been created based on said first and second distance.

FIG. 12 illustrates one embodiment of the system 10 comprising a node 1 and a device 2 wherein first 4 and second 6 maximum distances have been calculated by the node 1. FIG. 3 further illustrates the first 7 and second 5 geographic areas. The first geographic area 7 is the area wherein the node 1 has coverage for calculating the distance to the node 1 with good accuracy. The second geographic area 5 is the area wherein the node 1 can communicate with the device 2. The area between the first 6 and second 4 maximum distances is the part of the second geographic area 5 wherein the node 1 can communicate with the device 2 but not accurately determine the distance to the device 2.

Figure 13:
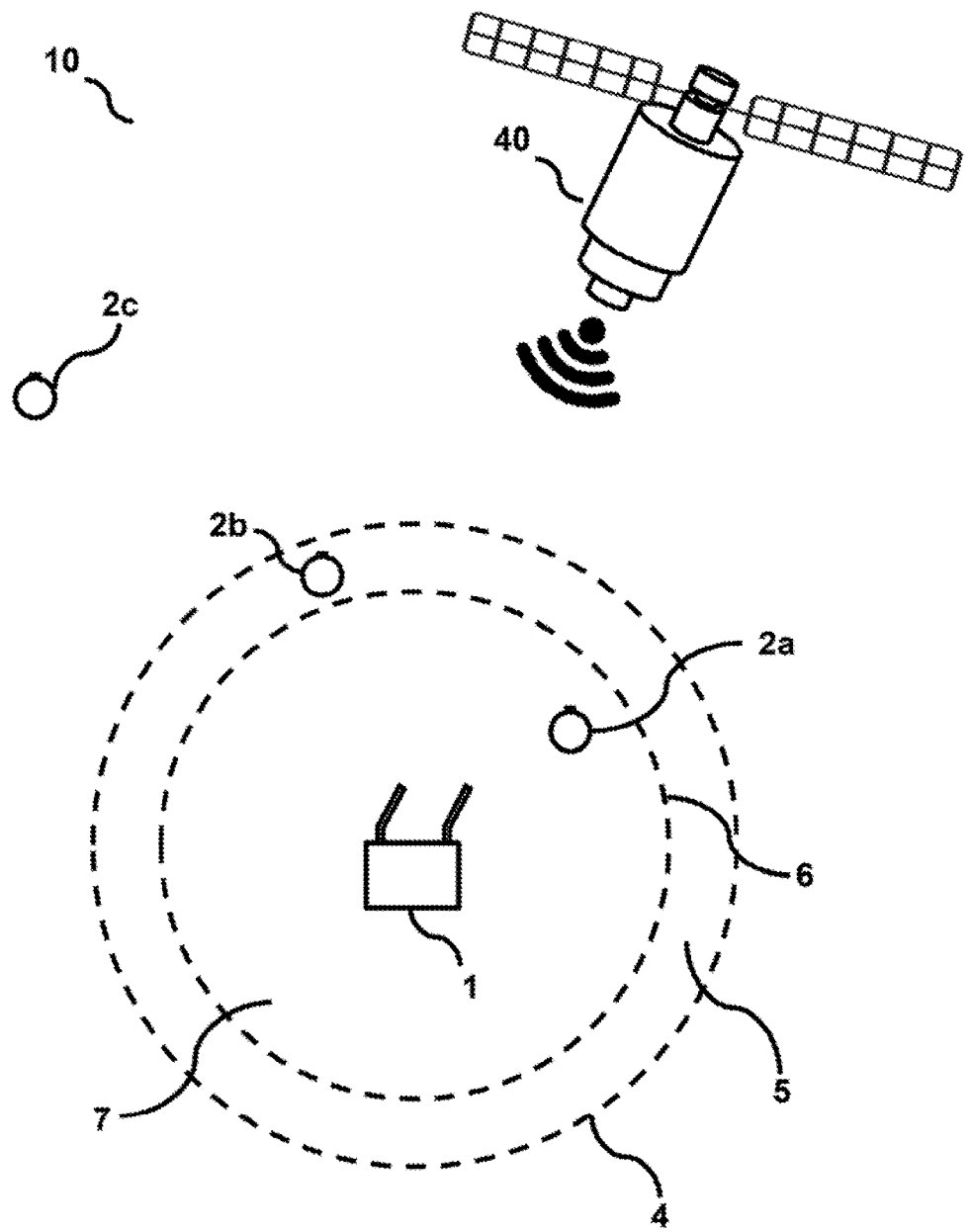
FIG. 13 illustrates an embodiment of the system for tracking a device comprising a node and multiple devices, wherein one device is inside the first geographic area, one is in the area between the boundaries of the first and second geographic area and one device is outside of the geographic areas with enabled positioning means.

FIG. 13 illustrates an embodiment of the system 10 wherein multiple devices 2a, 2b, 2c are present and the node 1 is adapted to track the devices 2a, 2b, 2c. The node 1 may in different embodiments of the solution as described herein be adapted to track any number of devices 2. The node 1 can successfully measure the distance to the device 2a and thereby also determine that the device 2a is within the first geographic area 7. The node 1 can further communicate with the device 2b but since the device 2b is located outside the first geographic area 7 the node can't determine the distance to the device 2b. The device 2c is outside of range for the node 1.

FIG. 13 further illustrates a scenario of one embodiment of the solution wherein the device 2 is illustrated at different positions of the device 2a, 2b, 2c. The device 2 starts as the device 2a located within the first geographic area 7. The node 1 sends a position request and receives a response.

Based on the transmitted request and the response the node 1 can successfully determine the position of the device 2a. The node 1 determines that the device 2a is within the first geographic area 7. The device 2a saves power by being in a passive mode except for when transmitting the response to the position request.

The device 2 moves outwards from the position of the device 2a to the position of the device 2b. The node 1 determines, for example through sending a position request or through only measuring the signal strength from the carrier wave, that the device 2b is outside of the first geographic area 7 but within the second geographic area 5. The node 1 sends an alert to the device 2a that the device 2a is outside of the first maximum distance 6. The device 2a receives the alert and activates its embedded or external positioning means communicating with another sources, such as a satellite 40. The device 2b can still transmit a response to the node 1 through its communication means over 300-1000 MHz.

The device 2 moves outwards from the position of the device 2b to the position of the device 2c and the device 2c is now out of range for the node 1. The device 2c is thereby out of the power saving mode and utilizes for example a satellite 40 to determine its position.

It is thereby one advantage with the present solution that the device 2b upon entering the intermediate zone between being in range for distance measurements by the node 1 and out of communication range with the node 1 may receive an alert activating positioning means in the device 2.

Figure 14:
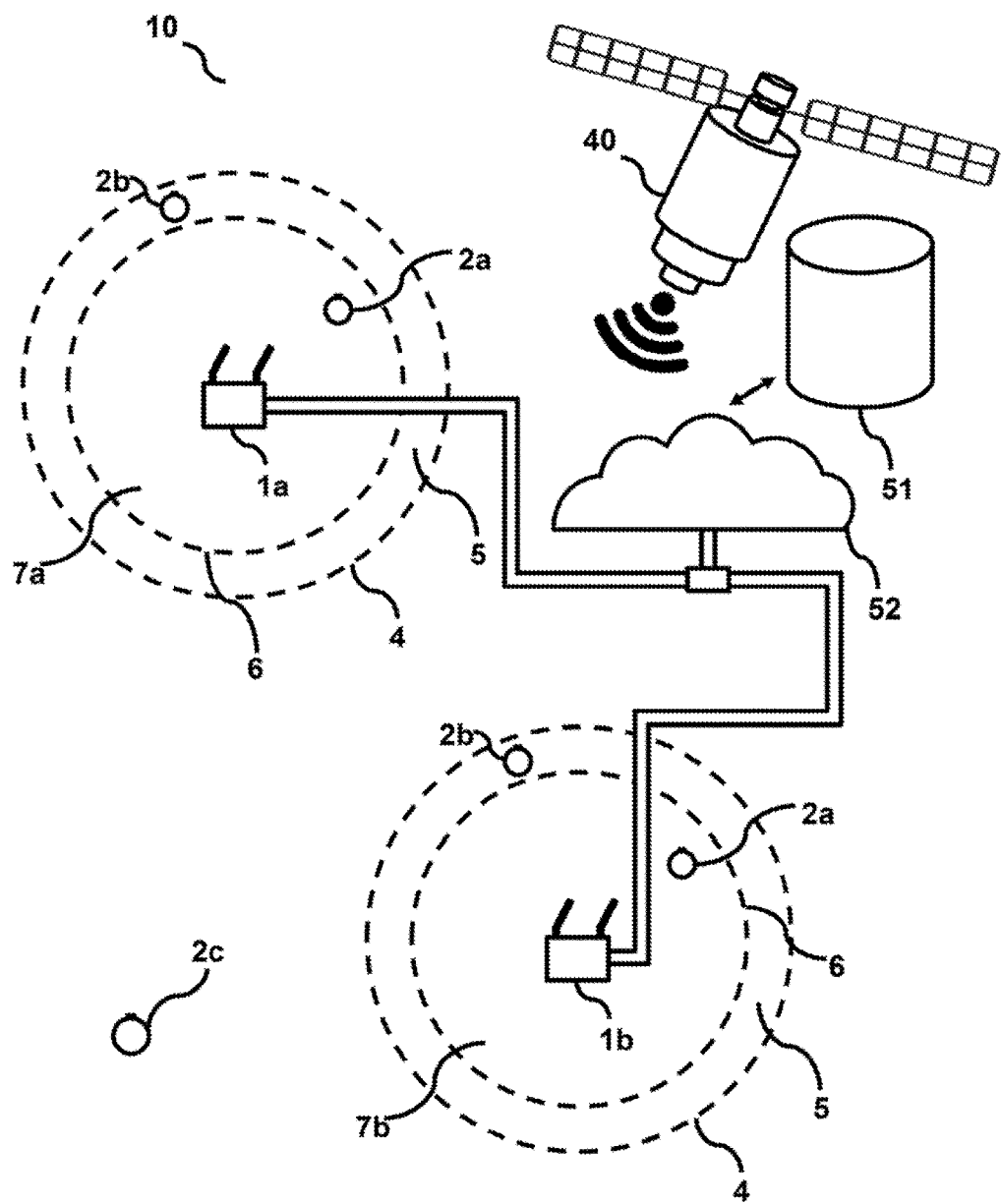
FIG. 14 illustrates an embodiment of the system for tracking a device wherein the system comprises multiple interconnected nodes and multiple devices to be tracked.

FIG. 14 illustrates one embodiment of a system 10 comprising multiple nodes 1 and multiple device 2 to be tracked. The embodiment as illustrated in FIG. 14 comprises multiple nodes 1 that are interconnected through for example internet 52 or any other network 52 comprising storing means 51. Depending of the application area for the system 10 and/or the nodes 1 and devices 2 different configuration could be used in different embodiments of the solution.

According to one embodiment could for example the geographic areas be different sites of construction wherein power tools are supposed to be used. The geographic areas might be constrictions limiting the device 2 from leaving the areas 7 without an alert being created. Multiple connected areas 7a, 7b could correspond to different construction sites. Some device 2 could be allowed to be connected to both the first node 1a and the second node 1b, others could be limited to one of the areas 7a, 7b.

The device 2, nodes 1, and system 10 could be implemented in many other application areas as well and the example as presented above is merely one example. The person skilled in the art understands that any implementation could be used for the system 10. According to one embodiment could any number of nodes 1a, 1b be used and that multiple nodes 1a, 1b in one embodiment could have areas 7 overlapping each other allowing some devices 2 to be in both areas 7a, 7b, and other devices 2 to only be in one of the areas 7a, 7b.

Figure 15:
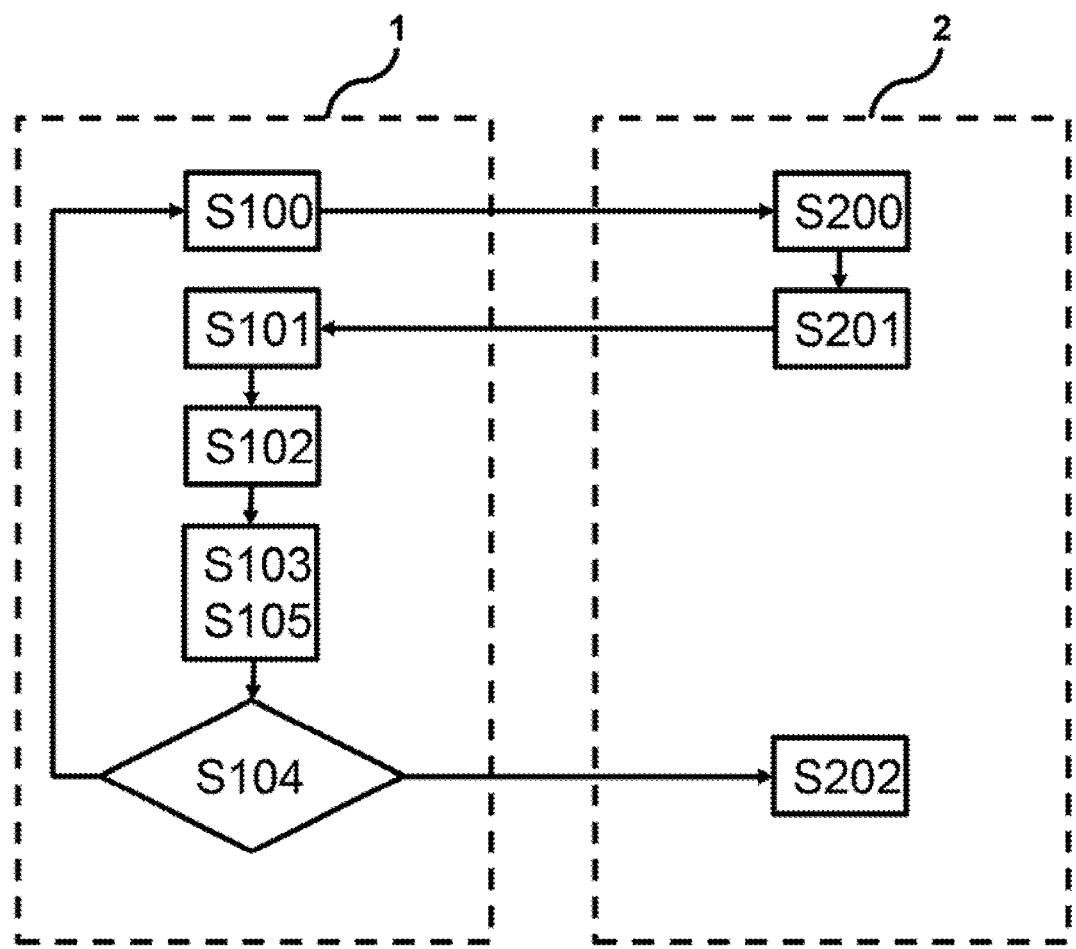
FIG. 15 illustrates a schematic view of an embodiment of the tracking system comprising a node and a device.

FIG. 15 illustrates a schematic view of the steps conducted in one embodiment by the node 1 and device 2. The node 1 transmits S100 a position request to the device 2 which receives S200 the position request. The device 2 responds S201 with a response received S101 by the node 1. The node 1 calculates S102 the distance to the device 2 and determines S103 a first maximum distance. In one embodiment the node 1 further determines S105 a second maximum distance. If the distance determined S102 by the node 1 is longer than the determined S103 first maximum distance the node 2 transmits S104 an alert to the device 2.

We claim:

1. A method in a tool control node for enabling unlocking, locking, and positioning of a power tool for prevention of unauthorized use, the method comprising:
   transmitting a first unlock message to the power tool, the message including an instruction to unlock the power tool,
   counting an authorization time period from transmission of the first unlock message to the power tool,
   transmitting a second unlock message to the power tool before a predetermined authorization time period threshold is reached, such that the power tool remains unlocked,
   transmission of a position message including an alert signal to the power tool to start transmitting a position response signal,
   receiving a position response signal from the power tool,
   determining a Received Signal Strength Indication and a distance to the power tool from the Received Signal Strength Indication, enabling positioning of a lost or stolen power tool,
   when the counted authorization time period exceeds a predetermined threshold,
   transmitting a lock message including an instruction to lock the tool, thereby enabling prevention of unauthorized use of the tool by remote unlocking and locking.

2. The method according to claim 1, wherein the tool control node is configured to determine a first maximum distance between the tool control node and the power tool based on a predetermined signal strength threshold for distance calculations and transmit an alert to the power tool if the distance between the tool control node and the power tool exceeds the first maximum distance.

3. The method according to claim 2, wherein the tool control node is further configured to determine a second maximum distance between the tool control node and the power tool based on a predetermined signal strength threshold for data communication.

4. The method according to claim 3, wherein the tool control node is further configured to use the first and second maximum distances to create geographic areas surrounding the tool control node.

5. The method according to claim 4, wherein the tool control node further is configured to enable a user to set the first maximum distance manually as long as it is lower than the predetermined signal strength threshold distance for distance calculations.

6. The method according to claim 1, wherein the tool control node in a frequency range between 300 and 1000 MHz transmits a position request to the power tool, receives the position response from the power tool, and calculate the distance to the power tool by time of flight of the radio signal.

7. The method according to claim 6, wherein the distance calculated by the tool control node is used to determine a position of the power tool.

8. A method in a power tool comprising a control unit for unlocking, locking and positioning of the power tool, the method comprising:
   receiving a first unlock message to the control unit, the message including an instruction to unlock the power tool,
   unlocking the power tool according to the instruction by the control unit via an actuator unit, counting an authorization time period from a reception of the first unlock message by a counter, when a second unlock message is received before a predetermined threshold of the authorization time period is reached the counter is restarted, such that the power tool remains unlocked, wherein the tool is arranged to be tracked by a tool control node through the steps;

receive a position message including an alert signal from the tool control node, the position message including an instruction to repeatedly transmit a position response signal as a response to the alert signal, thereby enabling distance determination between the power tool and the tool control node, such that positioning of a lost or stolen power tool is enabled, and when the predetermined threshold of the counted authorization time period is reached, locking the power tool according to the instruction by the control unit via the actuator unit.

9. The method according to claim 8, wherein the method further comprising the power tool enabling a positioning means comprised in the power tool upon receiving an alert that the power tool is beyond a first maximum distance between the tool control node and the power tool, wherein the first maximum distance is based on a predetermined signal strength threshold for distance calculation.

10. The method according to claim 9, wherein the power tool is adapted to use said positioning means only if the power tool is beyond a second maximum distance between the tool control node and the power tool based on a predetermined signal strength threshold for data communication.

11. The method according to claim 8, wherein the power tool is adapted to wake up upon receiving the position request from the tool control node.

12. The method according to claim 9, wherein the positioning means is GPS (Global Positioning System) positioning means.

13. The method according to claim 8, wherein the actuator unit is at least one of electrical switch, mechanical lock and semiconductor-based switch.

14. The method according to claim 8, wherein a lock message is received by the control unit, the lock message including an instruction to lock the tool, wherein the tool is locked by the control unit via the actuator unit.

* * * * *